(12) United States Patent
Gibbons

(10) Patent No.: US 8,021,050 B2
(45) Date of Patent: Sep. 20, 2011

(54) BEARING ARRANGEMENT

(75) Inventor: John L. Gibbons, Gloucester (GB)

(73) Assignee: Rolls-Royce PLC, London (GB)

( * ) Notice: Subject to any disclaimer, the term of this patent is extended or adjusted under 35 U.S.C. 154(b) by 58 days.

(21) Appl. No.: 12/461,422

(22) Filed: Aug. 11, 2009

(65) Prior Publication Data
US 2010/0098359 A1  Apr. 22, 2010

(30) Foreign Application Priority Data

Oct. 22, 2008  (GB) .................................. 0819337.7

(51) Int. Cl.
*F16C 33/02* (2006.01)
*F16C 32/06* (2006.01)

(52) U.S. Cl. ........................ 384/125; 384/37; 384/126

(58) Field of Classification Search .............. 384/37, 384/43, 103, 104, 106, 108, 536, 569, 582; 29/898.066, 898.15
See application file for complete search history.

(56) References Cited

U.S. PATENT DOCUMENTS

| | | | | |
|---|---|---|---|---|
| 1,828,289 A * | 10/1931 | Michell | ............ | 384/37 |
| 1,843,682 A * | 2/1932 | Kinnear | ............ | 188/307 |
| 2,244,197 A * | 6/1941 | Hessler | ............ | 29/898.066 |
| 3,087,038 A * | 4/1963 | Bethke | ............ | 200/237 |
| 4,445,792 A | 5/1984 | Trippett | | |
| 4,950,089 A * | 8/1990 | Jones | ............ | 384/103 |
| 5,295,744 A * | 3/1994 | Petrzelka et al. | ............ | 384/536 |
| 5,536,087 A * | 7/1996 | Rao et al. | ............ | 384/103 |
| 5,553,834 A | 9/1996 | Je et al. | | |
| 6,135,640 A | 10/2000 | Nadjafi | | |
| 6,698,929 B2 * | 3/2004 | Choi et al. | ............ | 384/103 |
| 6,964,522 B2 * | 11/2005 | Kang et al. | ............ | 384/106 |
| 6,988,703 B2 * | 1/2006 | Ropp | ............ | 248/618 |
| 2002/0097927 A1 * | 7/2002 | Lee et al. | ............ | 384/103 |
| 2002/0097929 A1 * | 7/2002 | Choi et al. | ............ | 384/103 |
| 2004/0179759 A1 | 9/2004 | Katou et al. | | |
| 2005/0013515 A1 | 1/2005 | Nakata | | |

FOREIGN PATENT DOCUMENTS

GB  2062130 A *  5/1981
SU  1636608 A1  3/1991

* cited by examiner

*Primary Examiner* — Marcus Charles
(74) *Attorney, Agent, or Firm* — Oliff & Berridge PLC

(57) ABSTRACT

A bearing arrangement having first and second components located for relative operational movement by a respective bearing. The bearing has a bearing element including a pack of resiliently flexible bristles or leaves for transmitting force between the components thereby locally to provide a relative kinematic constraint on at least one degree of freedom of the components during the relative operational movement.

12 Claims, 3 Drawing Sheets

BEARING ARRANGEMENT

BACKGROUND

1. Field of the Invention

The present invention relates generally to bearing arrangements.

2. Description of Related Art

Generally speaking, bearings are intended to allow relatively free operational movement of a pair of components, whilst transmitting forces between the components thereby locally to put a relative kinematic constraint on at least one degree of freedom of the components. For example, a rotary bearing will allow relative rotation of components but will transmit force in one or both of a radial direction and a thrust direction to provide a local kinematic constraint in these directions.

By "kinematic constraint" is meant prevention or arrest of motion of the components.

Bearings typically fall into two classes: rolling element bearings or plain bearings.

In the case of rolling element bearings, these may take the form of conventional ball bearings or roller bearings.

In the case of plain bearings, these may generally take the form of lubricated "metal-on-metal" plain bearings, dry or "self-lubricating" plain bearings comprising a non-metallic bearing liner (typically a polymer liner), or fluid bearings.

A problem with rolling element bearings and "metal-on-metal" plain bearings is that they tend to be "stiff" in the load-bearing direction and therefore provide a very rigid kinematic constraint. This stiffness may be disadvantageous in certain applications, where a certain degree of compliance in the bearing arrangement can help to limit contact pressures, which would otherwise be high because of the small contact area of the rolling elements, and therefore reduce bearing wear caused by manufacturing tolerances in the bearing, misalignment of separate bearings, as well as vibration and/or residual static and dynamic shaft imbalance in the case of rotating components. Additionally rolling element bearings have the disadvantage that they require a supply of lubrication.

The problem of wear can be significantly reduced by using "low friction" hydrostatic or hydrodynamic fluid bearings. However, these bearings require a supply of pressurised fluid in order to maintain their function (which may need to be supplied at a particularly high pressure in the case of "non-contact" hydrostatic bearings) and this generally requires relatively expensive, complicated and bulky ancillary equipment.

A "metal on metal" plain bearing may suffer high contact load in a contact zone between the bearing element and liner that may threaten the integrity of the bearing material. Plain bearings utilising a polymer liner which spreads the contact load over a greater area, thereby reducing the contact pressure, offer significantly increased compliance as compared to conventional rolling element and "metal on metal" plain bearings and can therefore provide a compliant kinematic constraint which may be effective in limiting contact pressures at the bearing surface. At the same time, the bearing function is not dependent upon an ancillary supply of working fluid as in a fluid bearing and therefore such bearings may offer a relatively simple and low-cost overall design, particularly where a dry "self-lubricating" polymer liner is used that does not require a separate supply of lubricant. However, polymer lined bearings tend not to be suitable for high temperature applications because at such temperatures significant degradation of the polymer liner may occur, compromising bearing performance.

Rolling element, hydrodynamic and hydrostatic bearings must be accurately aligned to operate effectively. The accuracy required of the bearing unit and location features on the device to which it is mounted increases the complexity of manufacture and hence the cost of the final product.

SUMMARY

It is an object of the present invention to seek to provide an improved bearing arrangement.

According to the present invention there is provided a bearing arrangement comprising first and second components located for relative operational movement by a respective bearing, the bearing having a bearing element comprising a pack of resiliently flexible bristles or leaves which extend from and are bonded to a support ring fixedly mounted to one of the components, and angled such that substantially only tips of the bristles or leaves are in direct contact with the other of the components, the bristles or leaves configured for transmitting force between the components thereby locally to provide a relative kinematic constraint on at least one degree of freedom of the components during said relative operational movement.

At least one constrained degree of freedom may be a translational degree of freedom.

The first component may be any rotating or non-rotating element, including in particular rotating discs, rotor shafts, impeller shafts and reciprocating piston rods, as well as spindles, pins, lugs, trunnions and axles used in precision machinery such as precision control mechanisms, instrumentation and data storage devices.

The bristles or leaves may be pre-flexed between the components thereby to pre-load the components and provide a positive kinematic constraint.

The bristles or leaves may be formed from polymer, metal or ceramic.

Optionally, one or more of said bearing elements may be a segmented bearing element comprising a plurality of said packs of resiliently flexible bristles or leaves.

In one embodiment, the first component is a rotatable shaft, the second component is a support structure for the shaft and the bearing element is in the form of an annular collar formed from said one or more packs of resiliently flexible bristles or leaves for transmitting a shaft load to the support structure.

A plurality of said flexible bristles or leaves may extend radially for transmitting a radial shaft bearing load to the support structure.

Additionally or alternatively, a plurality of said flexible bristles or leaves extend axially for transmitting an axial shaft bearing load to the support structure.

The bristles or leaves may be inclined at an acute lay-angle to the radius of the shaft, and/or at an acute lay angle to the longitudinal axis of the shaft.

The bristles or leaves may be fixedly attached to the shaft.

In an alternative embodiment, the first and second components may form a ball joint.

According to another aspect of the present invention, there is provided a method of operating a bearing arrangement according to the present invention. In particular, where the first component is a rotatable shaft, the method may comprise rotating the shaft at low speed.

BRIEF DESCRIPTION OF THE DRAWINGS

Embodiments of the invention will now be described, by way of example, with reference to the accompanying drawings, in which.

DETAILED DESCRIPTION OF EMBODIMENTS

Figure 1:
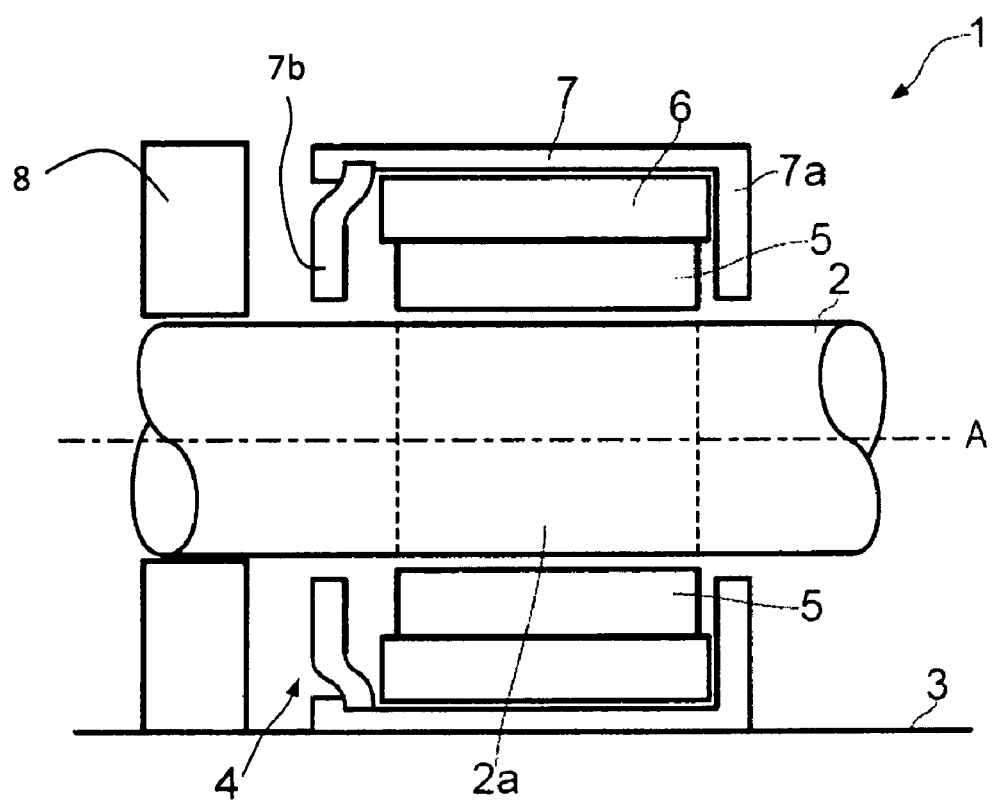
FIG. 1 is a diagrammatic, longitudinal cross-sectional view of a rotary bearing arrangement.

Referring to FIG. 1, a bearing arrangement 1 comprises a first component in the form of a rotatable shaft 2. The shaft 2 is carried on a second component, in the form of a load-bearing support structure 3, by a bearing 4.

In practice, the shaft 2 may be any suitable rotating shaft. For example, it may be a rotor shaft or a shaft for an impeller, in which case the support structure 3 may take the form of a gearbox housing or fan housing, forming part of a structural load path for reacting radial loads from the rotor or impeller; alternatively, the shaft 2 may be a pin or one of a pair of trunnions forming part of a respective pivot or hinge, in which case the bearing 4 may effectively form one of a respective pair of gudgeons or trunnion mounts, fixed to some structural element represented by the support structure 3. Various other practical applications may readily be appreciated.

The bearing 4 is intended to allow substantially free rotation of the shaft 2 about the axis A whilst radially locating the shaft 2 with respect to the support structure 3, thereby locally providing a relative kinematic constraint on the shaft 2 and support structure 3 in the radial direction.

The bearing 4 comprises a bearing element in the form of a collar 5. The collar 5 is supported on a corresponding support ring 6 fixedly mounted to an outer bearing casing 7, which is itself fixedly attached to the support structure 3. The bearing casing 7 is provided with radial protective end-flanges 7a, 7b, the end-flange 7a conveniently being formed integrally with the bearing casing 7 and the end-flange 7b by contrast being removable to assist with assembly and disassembly of the bearing 4.

The shaft 2 is journalled in the collar 5, which provides a local, radial kinematic constraint on a corresponding section 2a (corresponding to the axial length of the collar 5) of the shaft 2 relative to the support structure 3.

The collar 5 comprises a pack of radially extending flexible bristles (not individually discernible in FIG. 1) which provide the collar 5 with a degree of radial compliance by flexing under a sufficient radial load. Alternatively the collar may be provided with a pack of radially extending flexible strips or sheets ("leaves") having a relatively long axial length (i.e. in a direction along the axis of the shaft 2). The bristles or leaves may be welded, crimped or bonded by some appropriate means into the support ring 6, which is also known as a "backing plate".

As the shaft 2 rotates, radial loads are transmitted through the collar 5 to the support structure 3 (in this case via the support ring 6 and bearing casing 7), whilst contact pressures between the collar 5 and the shaft 2 are limited by radial flexing of the bristles.

Use of a flexible bristle or leaf configuration to provide the desired radial compliance in the bearing 4 means that individual bristles can be formed from wear-resistant and/or temperature resistant materials which might be insufficiently compliant when used as a conventional bearing liner or bush, for example metals and ceramics, although it is envisaged that the bristles might be formed from any suitable material, including polymers where appropriate.

Depending for example upon the specific material used for the bristles or leaves, and the specific operating conditions, the bearing 4 may be run as a "dry" bearing or lubricated in conventional manner, as appropriate.

It is envisaged that the degree of radial compliance of the collar 5 will be predetermined according to a particular application in order to provide a desired contact pressure profile between the shaft 2 and the collar 5, for example by selecting a suitable material for the bristles or leaves, and/or controlling the packing density of the bristles or leaves in the collar 5. It will be appreciated here of course that the collar 5 must in any event exhibit sufficient radial stiffness to transmit typical operational bearing loads between the shaft 2 and the support structure 3, including the weight of the shaft 2 if appropriate, in order to kinematically constrain the shaft 2 relative to the support structure 3.

Figure 2A:
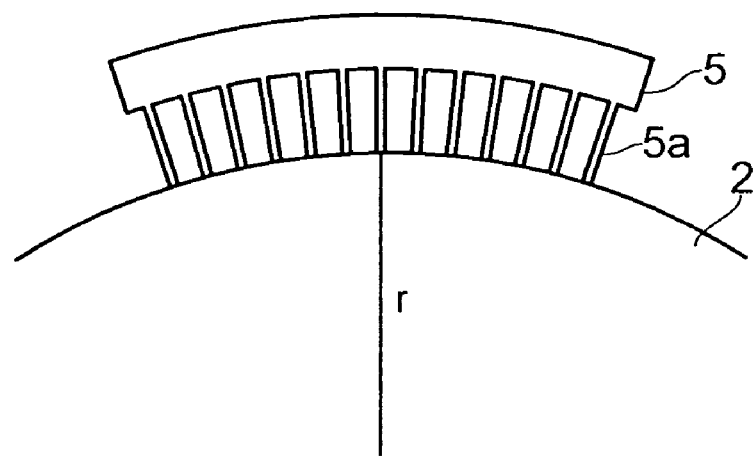
FIGS. 2a and 2b are simplified axial end on views showing alternative ways of arranging the bristles or leaves in a rotary bearing arrangement corresponding to the arrangement shown in FIG. 1.
Figure 2B:
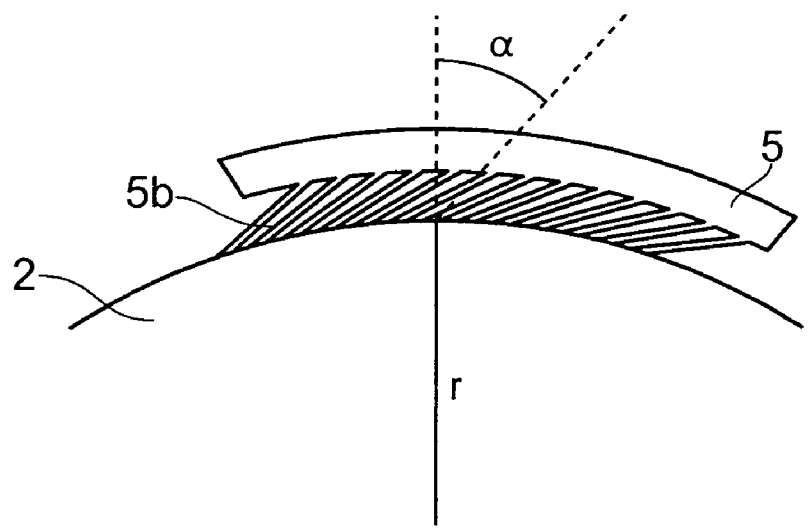

The radial compliance of the collar 5 may also independently be determined by the attitude of the bristles or leaves on the shaft 2. For example, FIG. 2a shows a configuration for the collar 5 whereby the bristles 5a extend radially towards the shaft 2 (the packing density of the bristles is unusually low in FIG. 2a, simply in order that the attitude of the bristles can be seen clearly); it is envisaged that such a configuration will exhibit relatively low radial compliance (relatively high radial stiffness). By contrast, FIG. 2b shows a configuration for the collar 5 (again at very low packing density) where the bristles 5b are inclined at a lay-angle $\alpha$ to the radius r of the shaft; it is envisaged that such a configuration will exhibit relatively high radial compliance (low radial stiffness). The bristles or leaves might similarly be inclined at a lay-angle to the axis of the shaft 2. Where the bristles are presented to the shaft at a lay-angle to the shaft radius, it is envisaged that the tip of each bristle should trail in the direction of rotation (indicated by the arrow in FIG. 2b) in order further to reduce potential wear on the tips of the bristles 5b.

The tips of the bristles forming the collar 5, or the inner edges of the leaves where leaves are used, may in any event be shaped to conform to the exterior of the shaft 2, again with the intention of reducing tip contact pressure and wear.

Use of a bristle or leaf configuration for the collar 5 also allows a bearing pre-load readily to be applied to the shaft 2 by initially flexing the bristles or leaves against the shaft 2. For example, an "interference fit" may be machined between the shaft 2 and the collar 5 thereby resulting in initial flexing of the resilient bristles or leaves against the shaft 2, when the shaft 2 is received in the collar 5, and exerting a radial pre-load on the shaft 2 thereby to provide a "positive" kinematic constraint.

It is envisaged that pre-loading will allow elimination of clearances between the bearing surfaces (in this case the shaft 2 and the collar 5). Elimination of clearance gaps in the bearing may be particularly advantageous for reducing errors in precision-mechanisms, for example in control systems or instrumentation, in particular where the intermittent or low speed nature of the bearing may make it sufficiently "low-wear" to tolerate pre-loaded contact between the bearing surfaces.

Given an appropriate packing density for a given application, it is envisaged that the bristles or leaves could be used effectively to trap particles and other contaminants within the body of the bearing element itself (for example in between the bristles forming the collar 5), thereby retaining these particles away from the respective bearing surface.

In a further embodiment the resiliently flexible bristles or leaves may be configured to trap a solid or liquid lubricant to provide lubrication between the bristles or leaves and the first component. Since the movement of the shaft relative to the collar 5 will be resisted by friction the maximum rubbing speed of the collar 5 will be limited by the speed at which heat generated can be dissipated. The capability of a dry rubbing bearing may be estimated by a design parameter "PV", which is the product of the contact pressure and the surface velocity. The PV of a design is dependent upon the inherent ability of the collar 5 and shaft 2 to dissipate heat combined with the coefficient of friction between their surfaces. Retention of lubricant in the collar 5 will result in it having a high PV capability since a low coefficient of friction and good thermal conductivity is established between the collar 5 and the shaft 2. The PV capability of the collar 5 may be further enhanced by selection of fibres with anisotropic thermal conductivity properties.

Materials with anisotropic thermal conductivity properties have high thermal conductivity along their length but have relatively low thermal conductivity laterally across their width. The heat generated due to contact between the bristles or leaves and the shaft 2 would therefore be conducted along the length of the bristle or leaf and not be diffused laterally. "High points" of the collar 5 may be deteriorated (i.e. eroded away) by localised heating and thus support less load, thereby advantageously providing a means for bedding-in the bearing.

It is also envisaged that, for a given packing density, adjacent bristles or leaves will provide a corresponding degree of frictional damping, which may be useful in certain applications to attenuate vibration of the assembly of which it forms a part.

Where it is desired to provide a thrust bearing, a plurality of the bristles or leaves can be arranged to extend axially, for example along the axis A between the shaft 2 and support structure 3.

FIG. 1 shows a shaft supported on a single bearing 4, which may particularly be suitable where for example shaft 2 forms a yoke. Where a single bearing is appropriate, the axial length of the bearing can be varied accordingly.

Alternatively, a first component such as the shaft 2 may be carried on a plurality of bearings, with one or more bearings comprising a suitable bristle or leaf configuration, generally as described above in relation to FIG. 1, and one or more of the remaining bearings 8 being a conventional rolling element or plain bearing.

Although the collar 5 in FIG. 1 is a continuous circumferential bearing element, the bearing element might alternatively be a "segmented" bearing element formed from several individual, discrete packs of bristles or leaves, for example to aid assembly and to accommodate differential thermal expansion. In any event, an individual pack may comprise a mixture of bristles and leaves.

The compliance of the bristles or leaves of the bearing of the present invention allows a high degree of misalignment of the first and second component to be tolerated. Since the bearing arrangement of the present invention is highly compliant, contact loads between the bearing and first component 2 are evenly spread. Additionally uneven loads can also be distributed, for example where the axis of the shaft and the bearing are misaligned and create a high load in one circumferential location.

In one embodiment 5% of the depth of the bristles or leaves may be used to accommodate misalignment. On a bearing where the entire depth of the brush or bristles extend beyond the end flange 7a,7b, a misalignment of 1 in 20 may be achieved. Appropriate design and material choice of the bristles or brushes may allow more misalignment to be accommodated.

Figure 4:
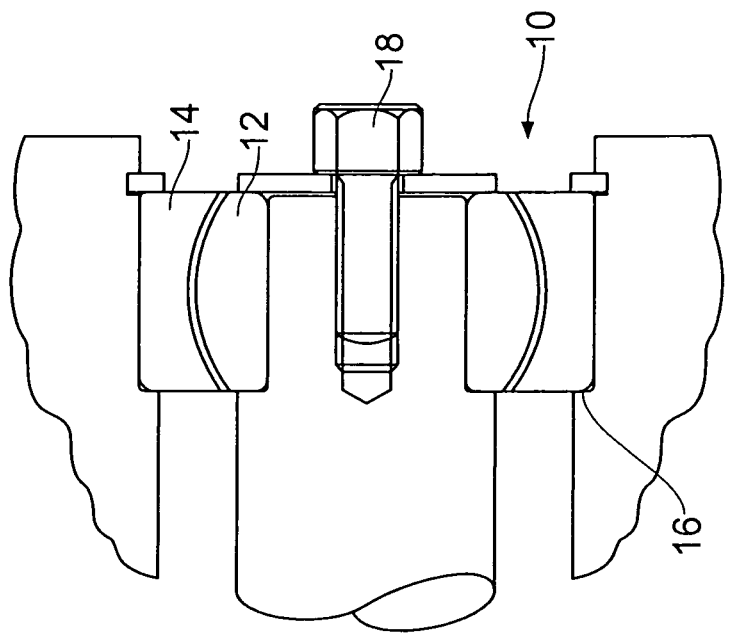
FIG. 4 (PRIOR ART) is a longitudinal view of a conventional spherical ball joint.
Figure 3:
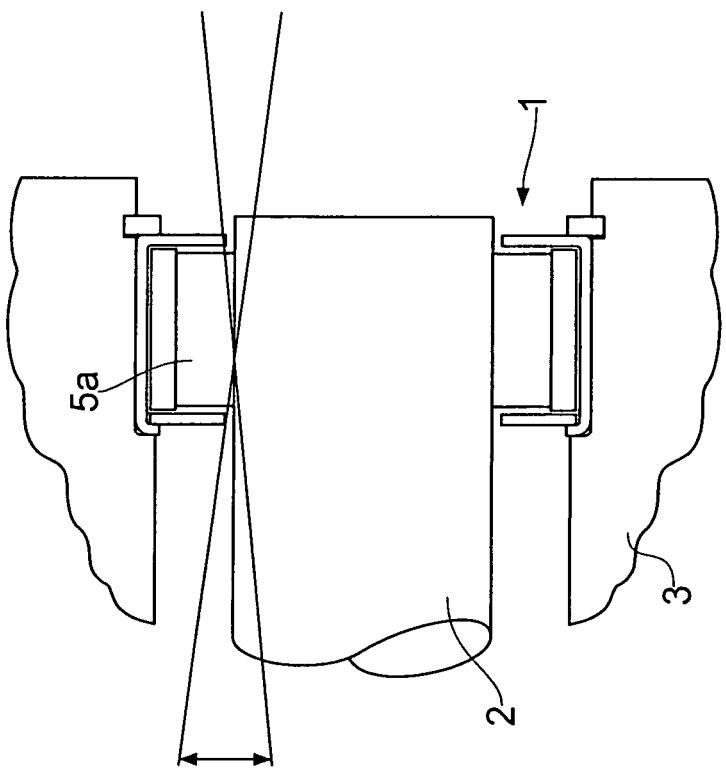
FIG. 3 is a longitudinal view of an alternative embodiment of the present invention.

Presented in FIG. 3 is a further embodiment of the bearing 1 of the present invention, employed at the junction of first and second components (for example, the junction of a shaft 2 and load bearing structure 3) and configured to prevent lateral relative movement whilst permitting relative angular movement (as indicated by the lines and arrows in FIG. 3). In this way the present invention provides the functionality of a ball joint (or "spherical bearing") shown in FIG. 4 (PRIOR ART). Such a bearing arrangement 1 may be smaller than a conventional spherical bearing 10, thus occupying less space. The present invention may also be easier to install than a spherical bearing 10 since the extra volume required to install and assemble a spherical joint 10 will not be required. The bearing 1 may also be of simpler design, since there is no requirement to manufacture a ball 12 and pre-assemble it into a spherical cup 14, and hence the bearing 1 is easier to manufacture. Additionally the bristles or leaves 5a of a bearing arrangement 1 may come into direct contact with the surface of the shaft 2, and thus there is thus no requirement for additional features to be added to the shaft 2 (for example the shoulder 16, or bolting arrangement 18) in order to prevent relative lateral movement whilst permitting relative angular movement.

The bearing arrangement of the present invention is may be employed in situations where the relative rotation between the first and second components (2,4) is constant, intermittent or oscillatory.

Although in the embodiment described with reference to FIGS. 1 to 3 the first component is a rotatable shaft, the invention is not limited to such an arrangement. Indeed, the first component need not be rotating component and may instead be a reciprocating component, such as an actuating rod. In an alternative embodiment the bearing arrangement forms an anti-vibration engine mount or anti-vibration machine mount. In a further embodiment the bearing arrangement forms an expansion mount for large/heavy structures such as plant equipment or bridge sections where both support and freedom of relative movement is required.

The invention claimed is:

1. A bearing arrangement comprising:
   a bearing;
   a first component;
   a second component; and
   a support ring fixedly mounted to the first component or second component, the first and second components being configured for relative operational movement by the bearing, the bearing having a bearing element including
   a pack of resiliently flexible bristles or leaves, each having tips, which extend from and are bonded to the support ring fixedly mounted to one of the components, and angled such that substantially only the tips of the bristles or leaves are in direct contact with the other of the components,
   the bristles or leaves being configured for transmitting force between the first component and second component to provide a relative kinematic constraint on at least one degree of freedom of the components during said relative operational movement.

2. The bearing arrangement according to claim 1, wherein the bristles or leaves are pre-flexed against the components thereby to provide a positive kinematic constraint.

3. The bearing arrangement according to claim 1, wherein the bristles or leaves are formed from polymer, metal or ceramic.

4. The bearing arrangement according to claim 1, wherein the bearing element is a segmented bearing element comprising a plurality of said packs of resiliently flexible bristles or leaves.

5. The bearing arrangement according to claim 1, wherein the first component is a rotatable shaft, the second component is a support structure for the shaft and the bearing element is in the form of an annular collar formed from said one or more packs of resiliently flexible bristles or leaves for transmitting a shaft load to the support structure.

6. The bearing arrangement according to claim 5, wherein a plurality of said flexible bristles or leaves extend radially for transmitting a radial shaft bearing load to the support structure.

7. The bearing arrangement according to claim 5, wherein a plurality of said flexible bristles or leaves extend axially for transmitting an axial shaft bearing load to the support structure.

8. The bearing arrangement according to claim 5, wherein the bristles or leaves are inclined at an acute lay-angle to the radius of the shaft.

9. The bearing arrangement according to claim 5, wherein the bristles or leaves are inclined at an acute lay angle to the longitudinal axis of the shaft.

10. The bearing arrangement according to claim 5, wherein the bristles or leaves are fixedly mounted at one end to the shaft.

11. The bearing arrangement according to claim 1, further comprising a plurality of bearings between the first component and second component.

12. A method of operating the bearing arrangement according to claim 5, the method comprising rotating the shaft at low-speed.

\* \* \* \* \*